United States Patent Office 3,032,482
Patented May 1, 1962

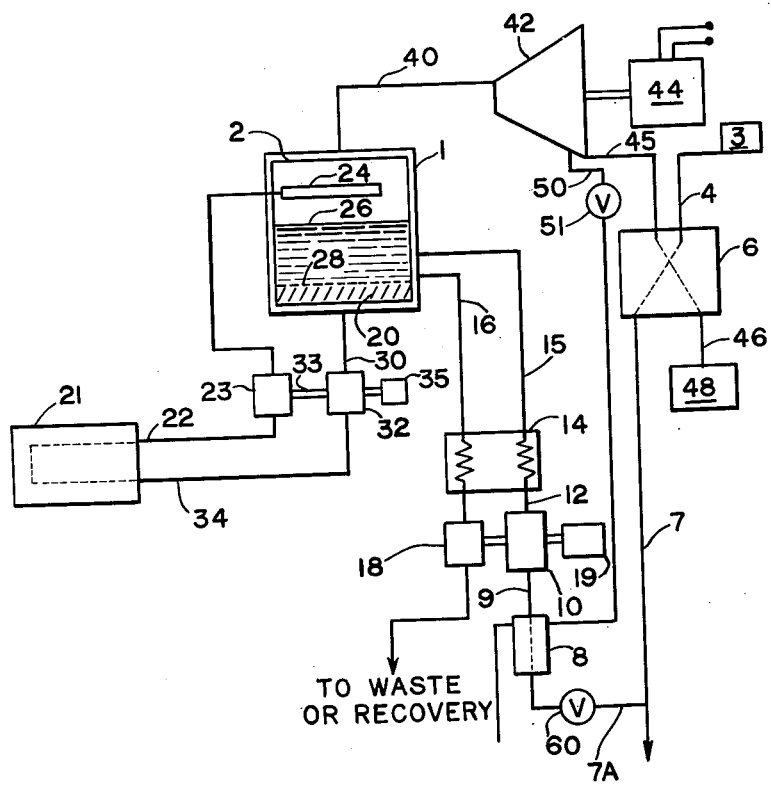

3,032,482
PROCESS OF RECOVERING FRESH WATER FROM SALT WATER WITH A HOT HEAVY MATERIAL
Richard W. Shoemaker, Rte. 1, Box 875, Grass Valley, Calif.
Filed Apr. 2, 1959, Ser. No. 803,658
3 Claims. (Cl. 202—74)

This invention provides method and apparatus for evaporating liquid from a solution.

The invention is applicable to many operations where it is desirable to evaporate a solution of a solvent and a solute to recover purified solvent, concentrated solute, or both. To illustrate the invention, specific reference is made to the evaporation of sea water to form high pressure steam and recover fresh water.

With the continuous expansion of industry and world population, the problem of adequate fresh water supplies steadily increases. The oceans are a virtually unlimited source of water, but prior to this invention, large scale conversion of sea water to fresh water has not been economically practical due to problems with scale, foaming, corrosion, etc., which arise in conventional operations involving heat transfer through the wall of a boiler. This invention provides means for obtaining fresh water, or steam, or both, from sea water without the usual problems of scale, foaming, corrosion, accompanying conventional boiler operation. This invention achieves boiling of salt water, or other solutions, without requiring heat transfer through the walls of a boiler.

The method of this invention includes evaporating liquid from a pool of solution of a solvent and a solute in a vaporization chamber by heating a fluid heat transfer medium to a temperature above the boiling point of the solution, and adding the heated medium to the pool of solution at one location in the chamber to vaporize some of the solvent and cool the heat transfer medium. The cooler medium is collected at another location in the chamber, reheated, and recirculated to the solution pool to vaporize additional liquid.

In the preferred method, the fluid heat transfer medium is a molten metal, although it may be other materials such as high boiling point organic materials, which are insoluble in water, or the solution being processed. The heat transfer medium is preferably of a specific gravity different from the solution, so that it can readily be recovered and reheated. The heat transfer medium preferably is maintained at a temperature between its melting point and boiling point, and the temperature of the solution in the chamber is maintained above the melting point of the heat transfer medium. When the heat transfer medium is a metal, its boiling point should be above that of the solution.

In terms of apparatus, the invention contemplates equipment for forming vapor from a pool of a solution of a solvent and solute which comprises a vaporization chamber adapted to hold the pool of solution at a normal operating level. Means are provided for adding solution of one concentration to the chamber, and means are provided for removing solution of a different concentration from the chamber. Supply means are provided for adding a fluid heat transfer medium to the solution in the chamber at one location, and means are provided for removing the heat transfer medium from the chamber at another location. Means are also provided for heating the removed medium to temperature above the boiling point of the solution in the chamber, and means are provided for returning the heated medium to the said supply means so that the heating medium is returned to the solution in the chamber at a temperature above the solution boiling point. Means are provided for removing vapor from the chamber.

In the preferred embodiment, the apparatus uses a heat transfer medium which is insoluble in the solution and of a greater specific gravity, and the medium is added to the solution above its normal operating level in the chamber. In this preferred embodiment, the heavy heat transfer medium is withdrawn from the chamber at a point below the normal operating level of the solution.

These and other aspects of the invention will be more fully understood from the following detailed description taken in conjunction with the accompanying drawing, which is a schematic flow sheet illustrating one embodiment of the invention.

Referring to the drawing, a vaporization chamber 1, which can be made of any conventional material such as steel, and may be provided with a suitable internal protective coating 2, such as a layer of glass, is supplied solution to be evaporated, say salt water, from a source 3 through a first section of solution supply line 4, a condenser 6, a second section of solution supply line 7, a by-pass line 7A, a deaerator 8, a third section of solution supply line 9, a solution supply pump 10, a fourth section of solution supply line 12, a heat exchanger 14, and a fifth section of solution supply line 15. Blow-down of concentrated solution is achieved through a blow-down line 16 connected to the chamber below the level where the fifth section of solution supply line opens into the chamber. The blow-down line 16 passes through the heat exchanger 14 where the concentrated solution leaving the chamber gives up some of its heat to the fresh, more dilute solution moving toward the chamber. The blow-down solution line 16 is connected to a turbine 18 which drives the supply pump 10. A motor 19 is also connected to the pump to supply any additional power that may be required to drive the supply pump. The blow-down solution is either discharged to waste, or to a recovery process.

A heat transfer medium such as molten metal 20 is supplied to the chamber from a heater 21 through a heat transfer medium supply line 22 and a hot medium pump 23 connected to a distributor 24 disposed in the chamber above the normal operating level 26 of solution in the chamber to discharge a fine spray of molten metal over substantially the entire horizontal cross-sectional area of the chamber. The heater can be supplied energy by any suitable means such as coal, oil, gas, or atomic fuel.

Molten metal falls from the distributor 24 in a fine spray into the pool of solution and settles to form a pool of molten metal 28 in the bottom of the chamber. The falling molten metal is above the boiling point of the solution and gives up sufficient heat in falling through the solution to form steam, which is superheated by reason of the minutely divided stream of falling hot metal, which before striking the pool of water at the bottom of the vaporization chamber, is at a much higher temperature than the steam. The temperature of the solution in the chamber is maintained above the melting point of the metal so that the metal remains molten. Molten metal is removed from the bottom of the chamber through a heat transfer medium collecting line 30 and flows through a hot metal turbine 32 which turns a shaft 33 to drive the hot medium pump 23. Collected molten metal flows through a medium transfer line 34 to the medium heater 21, where the medium is reheated for further cycling. A medium circulating pump motor 35 is connected to the hot metal pump 32 to supply any additional power required to circulate the heat transfer medium at the desired rate.

Vapor, or steam flows from the chamber through a steam line 40 connected at one end to the top of the boiler and at the other end to the inlet of a steam turbine 42, which drives an electric generator 44 to generate electric power for sale, or use in the process of this invention. Exhaust steam flows from the steam turbine outlet through a steam exhaust line 45 and through the condenser 6 where the exhaust steam is cooled by the incoming fresh salt water supply. The normal temperature of the sea water keeps the pressure in the steam in the condenser at about 28" of Hg vacuum. Pure steam condensate leaves the condenser through a line 46, and is carried to a fresh water storage tank 48.

A portion of the steam from the steam turbine at about 20 p.s.i.a. flows through a bleeder line 50 and a valve 51 to the deaerator 8, to aid in deaerating the incoming salt water supply. The amount of steam supplied to the deaerator is controlled by the valve 51.

In operation, the heater is turned on to bring the heat transfer medium above its melting point and above the boiling point of the solution in the boiler. Ordinarily, there is no metal in the chamber at this point, but if there is, it is heated to its melting point by suitable auxiliary means (not shown). If the heat transfer medium is lead, the metal is heated to a temperature of say 1500° F. Of course, any of the soft metals, such as tin, zinc, bismuth, cadmium, etc., or their alloys, can be used if desired, the primary requirement being that the boiling point of the heat transfer metal be higher than the desired steam temperature, and stable at suitable operating temperatures in excess of the desired steam temperature.

The molten metal, say lead, is pumped out the distributor 24 in a fine spray and falls into the solution, causing it to vaporize due to the heat given up by the lead. The solution pool is maintained at a sufficiently high temperature, say 650°, which is above the 622° F. melting point for lead, so that the lead remains molten and settles in a liquid pool in the bottom of the chamber to form a seal around the heat transfer medium collection pipe outlet 30. If necessary, the water solution in the chamber is brought above the melting point of the metal by the previously mentioned auxiliary heating means. Since the solution is above the melting point of the lead, the metal remains molten and flows out through the metal turbine to be recirculated through the heater.

Sea water is added to the vaporization chamber at the required rate through by-pass line 7A and is controlled by a valve 60 in the line. Air and other non-condensable vapors are removed from feed water as it passes through the deaerator 8.

The electric motor 35 supplies extra power to the turbine and pump 23 to make up power losses. The same is true for the motor 19 connected to the salt water supply pump 10.

The hot lead coming into the chamber supplies steam at a pressure of about 60 pounds per square inch gauge, with about 307° of superheat. This steam flow through the steam turbine to generate electric power, and is then condensed to provide a source of fresh water, as previously described.

In the event the steam produced from the boiler is not of required purity, it can be run serially through one or more additional units similar to the one just described, until the desired purity is obtained. Alternatively, if the water produced by the chamber is not of sufficient purity for drinking purposes, it can be used for irrigation or other purposes.

In addition to the metals mentioned, other heat transfer media can be used, such as air, or various organic synthetic compounds with proper melting points and boiling points to produce the desired operating range for the temperature steam required.

I claim:
1. The method of making potable water and producing power from a solution of salt in water in a vaporization chamber, the method comprising heating a fluid heat transfer medium to a temperature above the boiling point of the solution, the medium being heavier than the solution and insoluble in it, dispersing the heated medium in a spray over the pool so the medium falls into the pool of solution in the chamber from a point above the pool to vaporize some of the water and so water vapor rises from the pool and flows countercurrent to the falling heated medium to be superheated by the falling spray of heated medium, passing the superheated water vapor through a steam turbine to generate power, thereafter condensing the water vapor to form potable water, collecting settled heat transfer medium from the pool in the chamber, adding heat to the collected medium, and recirculating the re-heated medium to the chamber in the form of a spray over the pool to vaporize and superheat additional water.

2. The method of making potable water and producing power from a solution of salt in water in a vaporization chamber, the method comprising heating a metal heat transfer medium to a temperature above its melting point and the boiling point of the solution, the medium being heavier than the solution and insoluble in it, dispersing the heated medium in a spray over the pool so the medium falls into the pool of solution in the chamber from a point above the pool to vaporize some of the water and so water vapor rises from the pool and flows counter-current to the falling heated medium to be superheated by the falling spray of heated medium, passing the superheated water vapor through a steam turbine to generate power, thereafter condensing the water vapor to form potable water, collecting settled heat transfer medium from the pool in the chamber, adding heat to the collected medium, and recirculating the re-heated medium to the chamber in the form of a spray over the pool to vaporize and superheat additional water.

3. The method of making potable water and producing power from a solution of salt in water in a vaporization chamber, the method comprising heating a fluid heat transfer medium to a temperature above its melting point and the boiling point of the solution, the medium being heavier than the solution and insoluble in it, dispersing the heated medium in a spray over the pool so the medium falls into the pool of solution in the chamber from a point above the pool to vaporize some of the water and so water vapor rises from the pool and flows countercurrent to the falling heated medium to be superheated by the falling spray of heated medium, passing the superheated water vapor through a steam turbine to generate power, thereafter condensing the water vapor to form potable water, maintaining the pool at a temperature to keep metal in its molten, collecting settled heat transfer medium from the pool in the chamber, adding heat to the collected medium, and recirculating the re-heated medium to the chamber in the form of a spray over the pool to vaporize and superheat additional water.

References Cited in the file of this patent
UNITED STATES PATENTS

| 1,520,080 | Prichard et al. | Dec. 23, 1924 |
| 1,547,893 | Bergius | July 28, 1925 |
| 2,081,988 | Dreyfus | June 1, 1937 |
| 2,151,990 | Ruys | Mar. 28, 1939 |
| 2,445,043 | Souders et al. | July 13, 1948 |

FOREIGN PATENTS

| 524,012 | Canada | Apr. 17, 1956 |